(12) United States Patent
Abramson et al.

(10) Patent No.: US 10,242,710 B2
(45) Date of Patent: Mar. 26, 2019

(54) AUTOMATIC CINEMAGRAPH

(71) Applicant: INTEL CORPORATION, Santa Clara, CA (US)

(72) Inventors: Jonathan Abramson, Aminadav (IL); Gilad Baruch, Jerusalemi (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/282,533

(22) Filed: Sep. 30, 2016

(65) Prior Publication Data

US 2017/0294210 A1 Oct. 12, 2017

Related U.S. Application Data

(60) Provisional application No. 62/319,400, filed on Apr. 7, 2016.

(51) Int. Cl.

| | | |
|---|---|---|
| *G11B 27/00* | (2006.01) | |
| *H04N 5/93* | (2006.01) | |
| *G11B 27/031* | (2006.01) | |
| *G06K 9/00* | (2006.01) | |
| *G06K 9/46* | (2006.01) | |
| *G06K 9/74* | (2006.01) | |
| *G11B 27/34* | (2006.01) | |
| *H04N 9/70* | (2006.01) | |
| *H04N 5/92* | (2006.01) | |

(52) U.S. Cl.
CPC ........ *G11B 27/031* (2013.01); *G06K 9/00744* (2013.01); *G06K 9/00751* (2013.01); *G06K 9/00765* (2013.01); *G06K 9/4652* (2013.01); *G06K 9/748* (2013.01); *G11B 27/007* (2013.01); *G11B 27/34* (2013.01)

(58) Field of Classification Search
CPC . G11B 27/00; H04N 5/93; H04N 9/70; H04N 5/92
USPC .......................... 386/280, 278, 282, 300, 326
See application file for complete search history.

(56) References Cited

U.S. PATENT DOCUMENTS

| | | | |
|---|---|---|---|
| 9,672,866 B2* | 6/2017 | Sevilla-Lara | ........ G11B 27/007 |
| 2005/0084155 A1* | 4/2005 | Yumoto | ............. G06K 9/00087 |
| | | | 382/190 |
| 2008/0181499 A1* | 7/2008 | Yang | ......................... G06T 7/12 |
| | | | 382/174 |
| 2010/0098331 A1* | 4/2010 | Meng | ........................ G06T 7/11 |
| | | | 382/164 |
| 2011/0302238 A1* | 12/2011 | Sood | .................... G11B 27/005 |
| | | | 709/203 |

(Continued)

OTHER PUBLICATIONS

International Search Report and Written Opinion for International PCT Application Serial No. PCT/US2017/014873 filed Jan. 25, 2017 dated Apr. 19, 2017, 13 pages.

(Continued)

*Primary Examiner* — Daquan Zhao
(74) *Attorney, Agent, or Firm* — International IP Law Group, P.L.L.C.

(57) ABSTRACT

A system for performing automatic cinemagraph creation is described herein. The system comprises a memory and a processor. The memory is configured to receive series of images. The processor is coupled to the memory. The processor is to segment the series of images, select the most fitting times and mask, and apply the times and masks to the series of images to generate a cinemagraph.

25 Claims, 8 Drawing Sheets

(56) References Cited

U.S. PATENT DOCUMENTS

| | | | |
|---|---|---|---|
| 2012/0162105 A1* | 6/2012 | Sakurai | G06F 3/0488 |
| | | | 345/173 |
| 2013/0229581 A1* | 9/2013 | Joshi | G11B 27/031 |
| | | | 348/584 |
| 2014/0037213 A1* | 2/2014 | Niederberger | G06T 11/00 |
| | | | 382/195 |
| 2014/0104274 A1* | 4/2014 | Hilliges | G06F 3/011 |
| | | | 345/424 |
| 2014/0292769 A1 | 10/2014 | Sv et al. | |
| 2014/0327680 A1 | 11/2014 | Hoppe et al. | |
| 2015/0104113 A1 | 4/2015 | Ugur et al. | |
| 2015/0138223 A1* | 5/2015 | Sorkine Hornung | H04N 1/603 |
| | | | 345/591 |
| 2015/0269739 A1 | 9/2015 | Ho et al. | |
| 2016/0365121 A1* | 12/2016 | DeCaprio | G11B 27/036 |

OTHER PUBLICATIONS

Kossmann, Donald, "Microsoft Research Lab—Redmond", http://research.microsoft.com/en-us/um/redmond/projects/clipletsdesktop, date viewed Nov. 7, 2017, 4 pages, USA.
Wikipedia.com, "Cinemagraph", https://en.wikipedia.org/wiki/Cinemagraph, date viewed Nov. 7, 2017, 2 pages, USA.

\* cited by examiner

200

AUTOMATIC CINEMAGRAPH

CROSS REFERENCE TO RELATED APPLICATIONS

The present application claims the benefit of U.S. Provisional Patent Application No. 62/319,400, filed Apr. 7, 2016, which is incorporated herein by reference.

BACKGROUND

Cinemagraphs may be generated manually by experts who shoot videos with a tripod and use advanced image-editing software in order to obtain a good result. Typically, cinemagraphs require a great deal of manual labor to arrive at the finished video clip.

BRIEF DESCRIPTION OF THE FIGURES

The following detailed description may be better understood by referencing the accompanying drawings, which contain specific examples of numerous objects and features of the disclosed subject matter.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Figure 1:
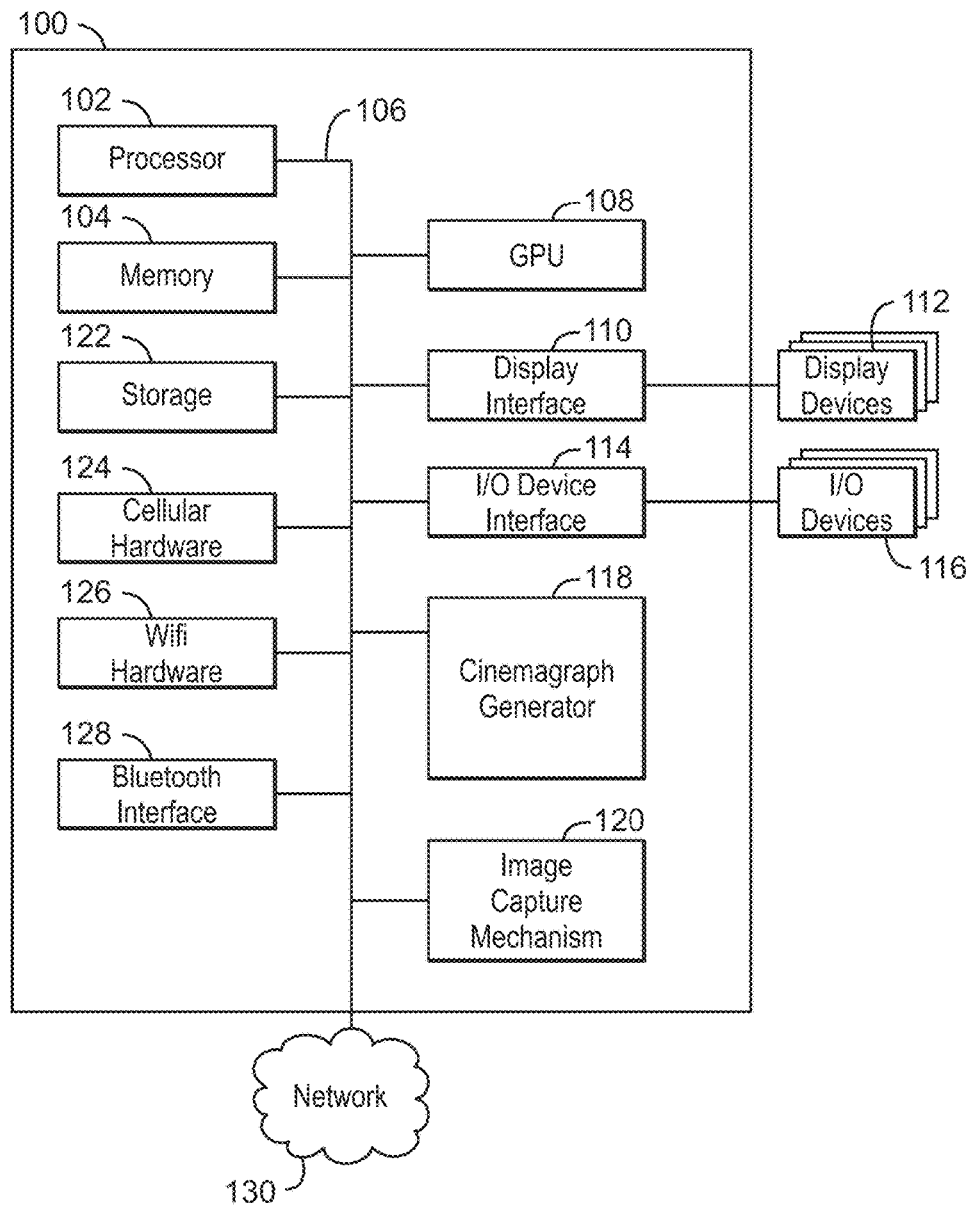
FIG. 1 is a block diagram of an exemplary system that enables automatic cinemagraphs.

Cinemagraphs can be made by taking a series of images, photographs, or a video recording, and, using image editing software, compositing the images, photographs or the video frames into a seamless loop of sequential frames. This is done such that the motion of the subject between exposures (for example, a person's dangling leg) is perceived as a repeating or continued motion, in contrast with the stillness of the remainder of regions within the images. In additional embodiments, a cinemagraph as used herein is a formatted as a still camera shot and includes some animated components within the still shot. In other embodiments, a cinemagraph may be referred to as a photo that comes to life.

Moreover, in embodiments a cinemagraph is a high quality graphics interchange format (GIF) file or video that is very smoothly looped. Looped images, frames, or video refers to a number of images, frames, or a video being rendered in an iterative fashion, without end. A cinemagraph may also be a video where only a portion of an image appears to have movement, without any loop. The cinemagraph typically includes a non-moving frame of reference, like a photograph (the camera doesn't move), where animation is smoothly looped within a series of images or photographs. The series of images or photographs includes some movement which either captures the entire essence of a scene, or isolates a movement within a larger scene.

In some cases, photos that also illustrate movement may be referred to as a GIF. The GIF may be a bitmap image file format that supports animation. This supported animation is what makes any movement in the GIF possible. In embodiments, a cinemagraph is a sleek GIF that does not suffer from jittery or jerky movements. Instead, the movement in the GIF is smooth and sleek. While a GIF image format has been described here for ease of use, any imaging or video file format may be used. Cinemagraphs may be generated manually by experts, shooting videos with a tripod and using advanced image-editing software. Traditionally, the cinemagraph is manually created and is a labor intensive process.

Embodiments described herein enable automatic cinemagraph creation. In embodiments, segmentation between distinctive movements in the video at different times is found. For each movement, the best beginning and ending frame is found. The beginning and ending frames may be selected as to cause the iteration to play as smoothly as possible. Times for the beginning and ending frames maybe selected along with a mask that will generate the best effect. Because the illusion of still image is created, the camera must be still during the shooting, i.e. using tripod. In embodiments, a camera stabilization feature may be used to give a still camera effect.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of an exemplary system that enables automatic cinemagraphs. The electronic device 100 may be, for example, a laptop computer, tablet computer, mobile phone, smart phone, or a wearable device, among others. The electronic device 100 may be used to capture video and still images and form a cinemagraph. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, streaming data, or the like, to be rendered or displayed to a user of the electronic device 100. In some embodiments, the GPU 108 includes a number of graphics engines, wherein each graphics engine is configured to perform specific graphics tasks, or to execute specific types of workloads.

The CPU 102 can be linked through the bus 106 to a display interface 110 configured to connect the electronic device 100 to one or more display devices 112. The display devices 112 can include a display screen that is a built-in component of the electronic device 100. The display devices 112 can also include a computer monitor, television, or projector, among others, that is externally connected to the electronic device 100. In embodiments, the display interface 110 is coupled with the display devices 112 via any networking technology such as cellular hardware 124, WiFi hardware 126, or Bluetooth Interface 128 across the network 130.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100. Accordingly, in embodiments, the I/O device interface 114 is coupled with the I/O devices 116 via any networking technology such as cellular hardware 124, Wifi hardware 126, or Bluetooth Interface 128 across the network 130. The I/O devices 116 can also include any I/O device that is externally connected to the electronic device 100.

The electronic device 100 also includes a cinemagraph generator 118. In embodiments, the cinemagraph generator 118 is a hardware module, a software module, or any combination thereof that enables automatic cinemagraph generation. In embodiments, the electronic device 100 also includes an image capture mechanism 120 that is to capture images and or video to be used by the cinemagraph generator 118 to automatically create cinemagraphs. For example, the image capture mechanism 120 may capture an image, a series of images, or a video. The cinemagraph generator 118 may generate cinemagraphs based on images from the image capture mechanism 120.

The storage device 122 is a physical memory such as a hard drive, an optical drive, a flash drive, an array of drives, or any combinations thereof. The storage device 122 can store user data, such as audio files, video files, audio/video files, and picture files, among others. The storage device 122 can also store programming code such as device drivers, software applications, operating systems, and the like. The programming code stored to the storage device 122 may be executed by the CPU 102, GPU 108, or any other processors that may be included in the electronic device 100.

The CPU 102 may be linked through the bus 106 to cellular hardware 124. The cellular hardware 124 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 100 may access any network 130 without being tethered or paired to another device, where the cellular hardware 124 enables access to the network 130.

The CPU 102 may also be linked through the bus 106 to WiFi hardware 126. The WiFi hardware 126 is hardware according to WiFi standards (standards promulgated as Institute of Electrical and Electronics Engineers' (IEEE) 802.11 standards). The WiFi hardware 126 enables the electronic device 100 to connect to the Internet using the Transmission Control Protocol and the Internet Protocol (TCP/IP). Accordingly, the electronic device 100 can enable end-to-end connectivity with the Internet by addressing, routing, transmitting, and receiving data according to the TCP/IP protocol without the use of another device. Additionally, a Bluetooth Interface 128 may be coupled to the CPU 102 through the bus 106. The Bluetooth Interface 128 is an interface according to Bluetooth networks (based on the Bluetooth standard promulgated by the Bluetooth Special Interest Group). The Bluetooth Interface 128 enables the electronic device 100 to be paired with other Bluetooth enabled devices through a personal area network (PAN). Accordingly, the network 130 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

As used herein, automatic refers to a real time action without input from a user during the creation process. The automatic cinemagraph is created with minimal to no input from a user during creation of the cinemagraph. However, a user may select the series of images to be used in the cinemagraph, and may select the best of several automatically created cinemagraphs. In embodiments, cinemagraphs may be still photographs in which a minor and repeated movement occurs, forming a video clip (usually in the GIF format). The contrast between the moving part within the series of images and the frozen background portions attracts the eye and provokes curiosity. Cinemagraphs are often published as an animated GIF or in other video formats, and can give the illusion that the viewer is watching an animation.

Techniques are described herein to automatically generate cinemagraphs from a short video, series of images, or series of frames without the need of expertise at shooting or editing. The present techniques are based on color data and depth data. Static and dynamic elements are combined in an imaging format in order to create an attractive and distinctive image.

Figure 2:
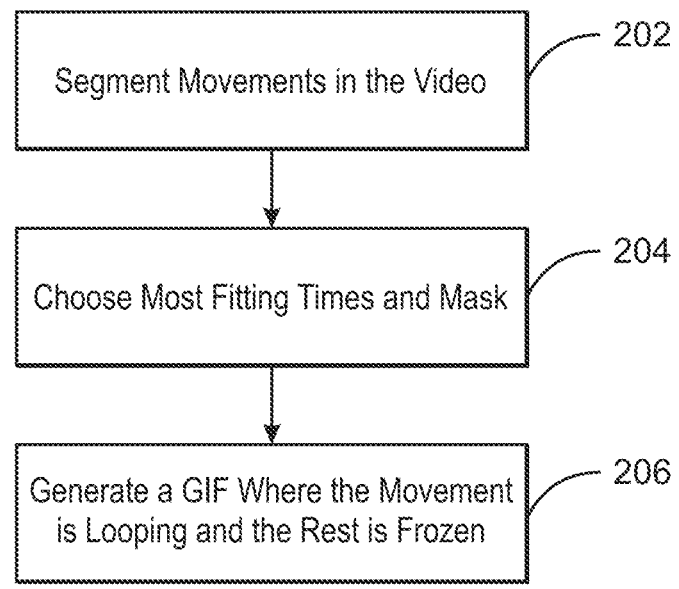
FIG. 2 is a process flow diagram of a method for generating automatic cinemagraphs.

FIG. 2 is a process flow diagram of a method for generating automatic cinemagraphs. A media content such as a plurality of photographs, a plurality of images, or a video may be captured from an image capture mechanism, such as a camera. The media content may also be obtained from streaming data sent to a device such as the electronic device 100. In embodiments, the media may be retrieved from local or remote storage. For ease of description, the present techniques are described using a video. However, any type of media content may be used. Additionally, in some cases, the terms image and frame may be used interchangeably, where each video includes a series of images or a series of frames.

At block 202, movements in the video are segmented. In embodiments, a controller may segment moving areas and non-moving areas in the series of frames based on color. Segmentation may refer to distinguishing dynamic objects from static objects in the series of images or each frame of the video. In embodiments, a mask may be applied to the image and the inverse of the mask is obtained to initially segment dynamic objects from static objects in the series of images. In embodiments, depth data can be used for additional segmentation based on the depth of each initial segment. Thus, in some cases, an initial segment can be refined based on the depth into a plurality of segments.

Figure 5:
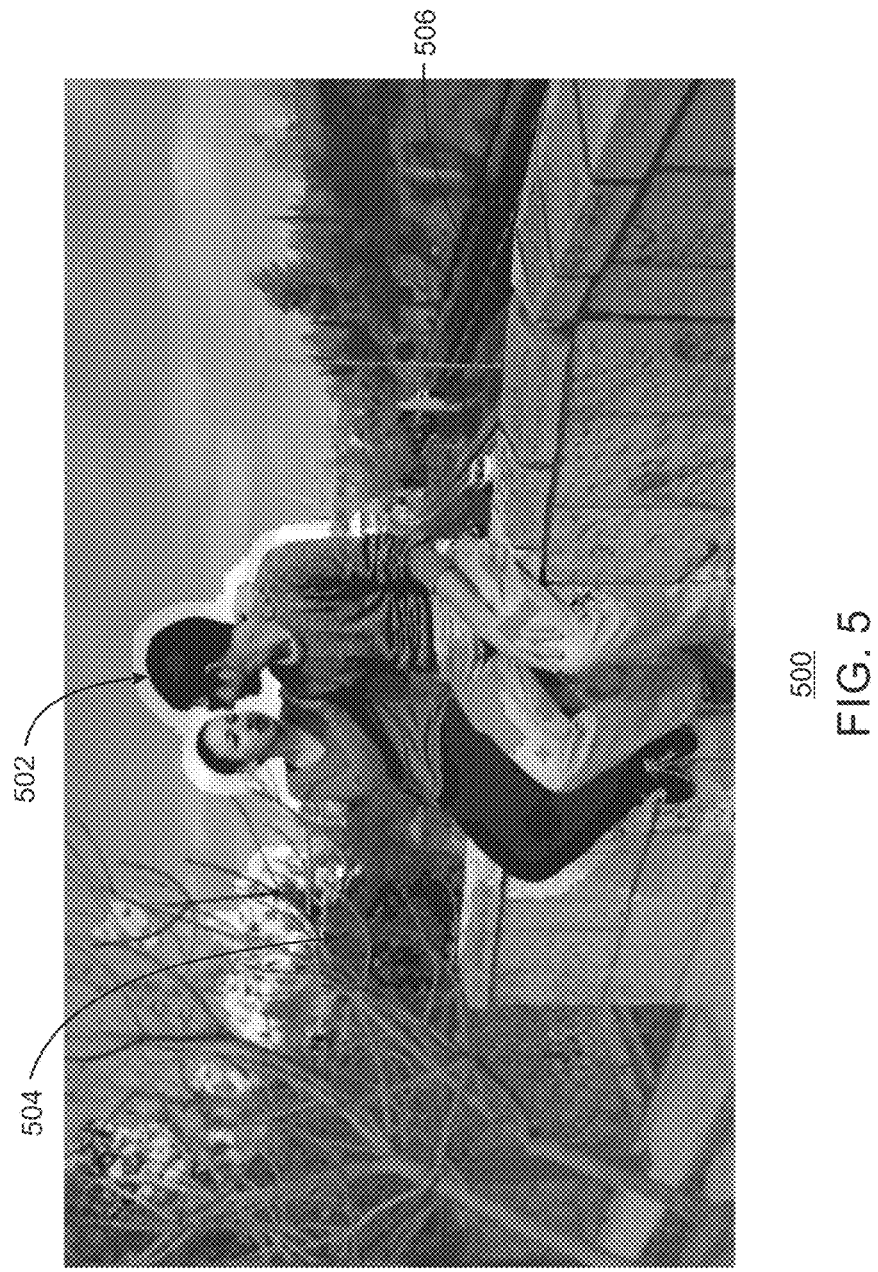
FIG. 5 is an illustration of segmentation according to color.

At block 204, the most fitting times and masks are selected. The times are selected such that a few movements have occurred during that time. In embodiments, a likelihood unit may select a beginning frame and an ending frame with particular timestamps. The most fitting times may refer to the time period between a timestamp of the beginning frame and a time stamp of the ending frame. These timestamps may be selected such that some movement occurs during the time period between the two timestamps. The beginning and ending frame may also be selected such that a minimum time period has elapsed between the two frames, and the position of objects in the beginning frame is nearly the same in the ending frame. For example, consider a video of a person sitting on a ledge and swinging their legs with a road in the background (FIG. 5). While cars on the road in the background will not return to the same position, the swinging legs will eventually be near their starting position. Accordingly, frames with the swinging legs near the position marked in the beginning frame may be considered for use as an ending frame.

At block 204, the mask may also be selected. In embodiments, the mask may obscure segments or portions of the images with no movement for each frame, while allowing areas with movement to be visible in each frame. In embodiments, portions of the images with no movement may be referred to as static while portions of the images with movement may be referred to as dynamic. The mask may be selected such that the masking occurs in segments where there is no movement. As used herein, an area of no movement is an area where object motion does not exceed a distance threshold. In segments of no movement, each frame may be composited with pixel values from a reference frame so that the areas of no movement are consistent along the sequence of images. A masking unit may apply a mask to the non-moving areas of the beginning frame, the ending frame, and a plurality of frames with timestamps between a timestamp of the beginning frame and a timestamp of the ending frame. At block 206, a GIF is generated where the movement discovered in segments of the series of images is looping, while the static segments of the series of images is frozen. A cinemagraph generator may generate a cinemagraph by iteratively rendering the beginning frame, the ending frame, and the plurality of frames.

Figure 3:
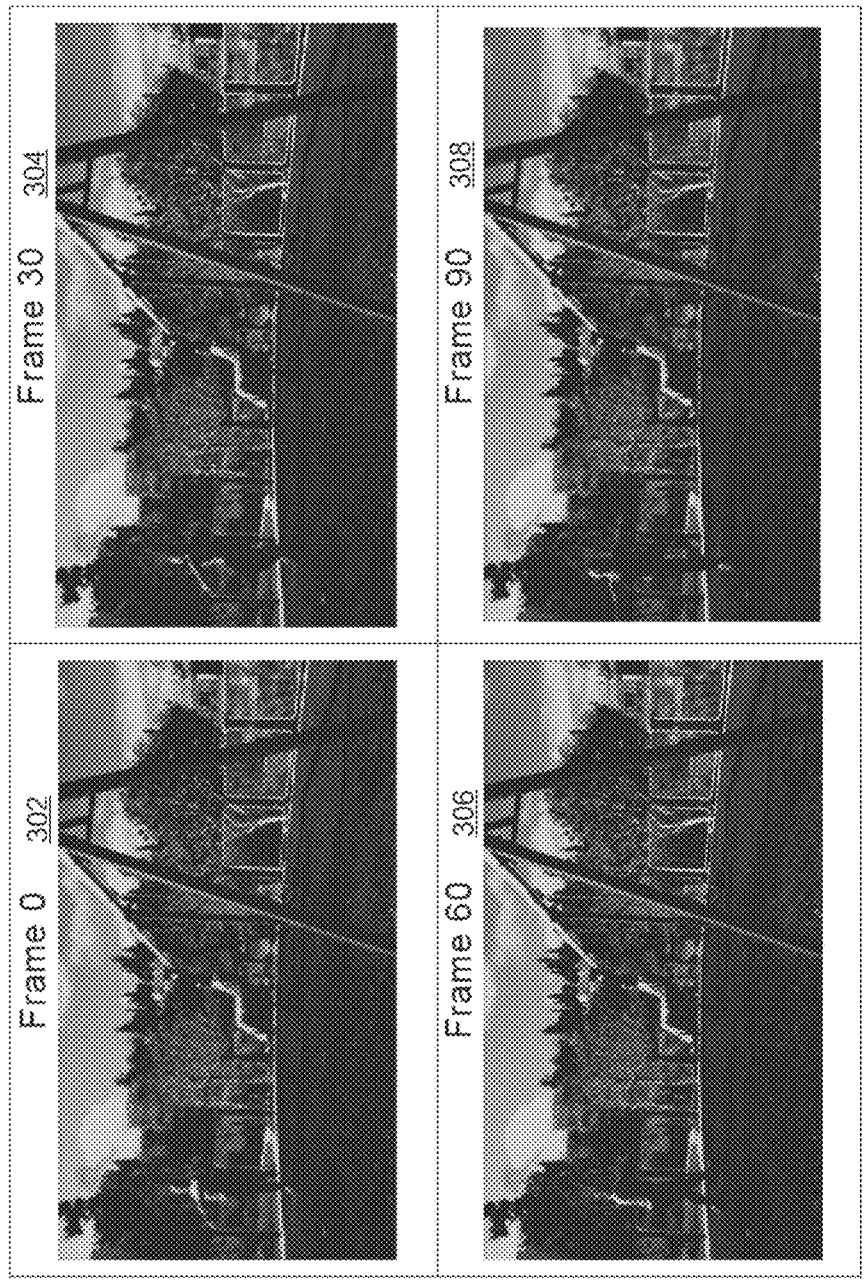
FIG. 3 is an illustration of a cinemagraph at four frames selected from a series of frames.

FIG. 3 is an illustration of a cinemagraph 300 at four frames selected from a series of frames. In particular, frame 0 at reference number 302, frame 30 at reference number 304, frame 60 at reference number 306, and frame 90 at reference number 308. The frames can be used to represent a cinemagraph generated according to the techniques described herein. In particular, the man on the swing at reference number 310 in each of frame 0 at reference number 302, frame 30 at reference number 304, frame 60 at reference number 306, and frame 90 at reference number 308 remains stationary or static. The woman at reference number 312 moves in a twirling fashion through each of frame 0 at reference number 302, frame 30 at reference number 304, frame 60 at reference number 306, and frame 90 at reference number 308.

To create the cinemagraphs automatically, a good segmentation is determined between distinctive movements in the video at different times. For each movement, the best beginning and ending frame is found, which will cause the iteration to play as smoothly as possible. Additionally, the particular times and mask which will generate the best effect is found. Because the cinemagraph includes the illusion of a still image, the camera must be still during the shooting. In embodiments, a tripod may be used to ensure the capture of images using a single frame of reference. Alternatively, in embodiments, depth data may be used to determine the exact relation between the camera positions at different frames, and then that relation is used to create a single frame of reference among the series of images. In embodiments, the camera positions may be averaged to create a single frame of reference among the series of images.

Figure 4:
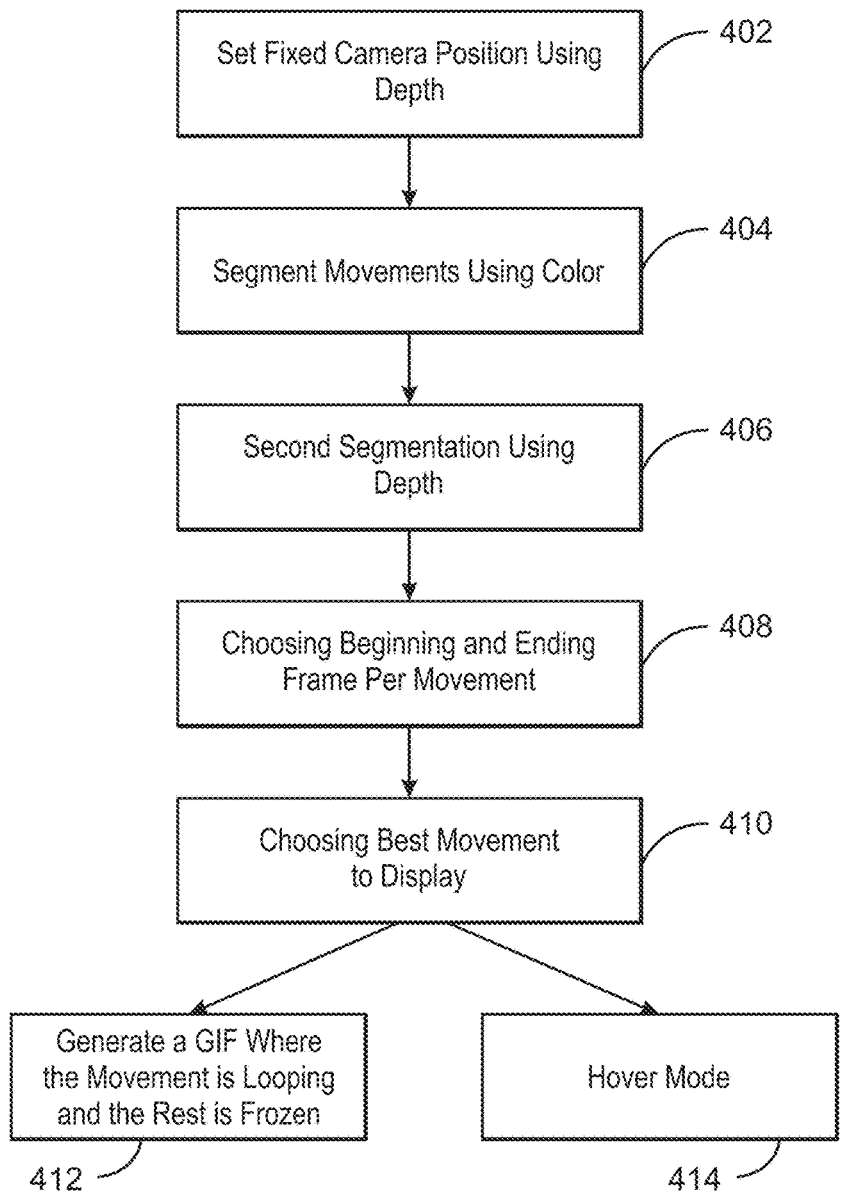
FIG. 4 is a process flow diagram of a method for creating automatic cinemagraphs.

FIG. 4 is a process flow diagram of a method 400 for creating automatic cinemagraphs. At block 402, a fixed camera position may be set using depth. In order to create the illusion of a still image, the camera must be still during image capture. One can achieve jitter free image capture by using a tripod, however the present techniques are not limited to the use of a tripod. In the present techniques, any depth information can be used for to create a fixed camera position, such as incomplete or noisy depth information. The depth information may be used with data from other sensors of the electronic device to model the motion of the camera. Each frame in the video may then be warped according to the model to eliminate jitter in the video. While the present techniques describe a type of image stabilization as based on depth, any image stabilization technique can be used. Accordingly, image stabilization may refer to any set of techniques used to obtain a series of images free from jitter, blur, or any other artifacts that result from camera movement during image capture.

In embodiments, depth data from a camera can be used along with inertial measurement unit (IMU) data to extract the exact relation between the camera positions at different frames. The depth data and the IMU data may be used to create a model. In embodiments, such a model can be created by other techniques of shape from motion (SfM) or 3D reconstruction from a monocular (single camera) or from RGB-D (stereo/depth camera) or through other sensors attached to the device (LiDAR, etc.) The model describes the relationship between a reference frame with a single point of view and all other frames in the video. Once the model is generated, the video can be rendered from the single point of view for each frame. In embodiments, regions in frames that were not visible during all of the recording may be cropped out of the video. In cases where there are no sharp movements and the depth data is valid, the output is a video which seems like it was taken with a tripod or other stabilization apparatus such as a gimbal. Additionally, image stabilization can be performed by tracking the position of the camera during image capture and compensating for any jitter by eliminating movement between consecutive images. Further, optical flow methods for image stabilization can be implemented without explicitly tracking the position of the camera. In embodiments, image stabilization may also change the pixels according to their depth to compensate for movement of the camera.

At block 404, the movements are segmented using color. This results in the different movements in the video being separated. To separate the different movements in the video, all the regions where there is no difference in the color all along the video (up to some threshold to overcome changes occurred by lighting changes and so) are marked. Connected components over the inverse of this mask as used to designate different segments. Morphology operations and a few filters may be used to segment various movements so that a good stable segmentation is created without noisy flickering. In embodiments, a user may be able to select the segmented areas and designate areas as a static or dynamic component of the cinemagraph.

FIG. 5 is an illustration of segmentation according to color as described at block 404 (FIG. 4). In embodiments, segmentation occurs using a red, green, blue (RGB) image, where each segment includes areas with similar color values. Segmentation may also be performed using a color or grayscale image such as a normal image taken from a regular camera. Additionally, other color spaces may be used, such as BGR, YUV, RAW10, YCbCr, and the like. For example, consider a person wearing black slacks that is sitting on a beige color ledge. The black slacks may include pixels in a range of pixel values that are a part of the slacks, while the beige ledge may also include a range of pixel values to create the ledge. When segmenting the images according to color, the black slacks will be segmented from the beige ledge, regardless of any movement. Similarly, in FIG. 5 darker areas of greyed pixels represent where there was no change in color during the video. The areas indicated at 502, 504, and 506 are areas with movement. Area 502 represents the couple talking with the lady moving her leg, and area 504 represents the leaves on the left moving in the wind. Area 506 is the road on the right with the moving cars. Each of these areas of movement 502, 504, and 506 can be kept while the others freeze in the final cinemagraph. It can be seen that labeling components over the inverse will give a good movements segmentation. Thus, first all the pixels where there was no change are found, and then the inverse of those pixels result in a good movement segmentation. Put another way, the inverse is obtaining all the other pixels in the image based on initially finding the pixels where no change occurs. Local statistics may be gathered over the entire video (or over portions of the video) to identify areas which are labeled as areas with no movement. The rest of the areas in the video are considered to be areas with motion. In embodiments, a connected component analysis to label areas with motion versus areas with motion. For ease of description, the color image is described as an RGB image. However, other image formats may be used, such as LUV, CMY, YUV, and the like.

Referring again to FIG. 4, at block 406, if depth data is available, the segmentation determined at block 404 using color information can be improved or refined using the depth data. In embodiments, the segments found at block 404 may be separated into different depth layers. For example, in FIG. 5 the segmentation of the couple at area 502 includes also part of the road far behind them. Using depth, those areas may be further segmented into separate and distinct areas of movement based on depth values. At block 408, a beginning and ending frame is found with a maximum likelihood that eliminates a "jump" in the clip after every iteration. In this manner, the loop will iterate smoothly. In embodiments, pixel values between a candidate beginning frame and candidate ending frame are subtracted and the beginning/ending frame pair with values closest to zero are selected as the pair with the maximum likelihood that any potential jump in movement between the two frames is eliminated.

In embodiments, the beginning and ending frame may be found by an exhaustive search that may include comparing pairs of frames where there are at least 100 frames in between. In embodiments, a sparse tracker may be used to automatically find the beginning and ending frames. In embodiments, the sparse tracker may be a Lukas-Kanade tracker. In embodiments, a Lucas-Kanade optical flow algorithm is used to find corresponding points on the current frame image. The Lucas-Kanade algorithm assumes that the flow is essentially constant in a local neighborhood of the pixel under consideration, and solves a set of basic optical flow equations for all the pixels in that neighborhood using the least squares criterion.

In cases that no such pair that satisfies the beginning and ending frame requirements, a number of frames may be selected and then added again in reverse order. In some cases, frames may not be actually added in reverse order. Rather, a motion is created by taking the movement portions from beginning-to-end, and the moving portions or segments where movement is detected are played both forward and backward to create a movement part start-to-end-to-start based on a subset of frames. In embodiments, the beginning and ending frame requirements may be that all movement that occurs between the beginning and the ending frame is lower than a distance threshold that eliminates any perceivable jump or jitter between the two frames. The beginning and ending requirements may also be a minimum amount of movement between pixels in the moving segments. For example, consider the movement between two consecutive frames, where the movement is subtle. However, if the ending frame is rendered and then the beginning frame is rendered next in an iterative looping fashion when the beginning and ending frame requirements are not satisfied, a disturbing jump may occur between the two frames. Instead, the frames can be rendered again in a reverse order. In this embodiment, the frames may be rendered from the beginning frame to the ending frame, and then back to the beginning frame in reverse order including all the frame between the beginning and ending frames. Put another way, the frames are rendered forwards then backwards repeatedly, such that when the ending frame is reached whining rendering all the frames from the beginning in chronological order, frame "ending"−1 is rendered, which makes only a subtle movement, then "ending"−2, and so on until the beginning frame is reached. The rendering repeats and the frames "beginning"+1, "beginning"+2, "beginning"+3 until the ending frame is reached. Thus, forward and backward rendering includes rendering the beginning frame first, then "beginning"+1, "beginning"+2, "beginning"+3 . . . "ending"−3, "ending"−2, "ending"−1, ending frame, "ending"−1, "ending"−2, "ending"−3 . . . "beginning"+3, "beginning"+2, "beginning"+1, beginning frame, "beginning"+1, "beginning"+2 . . . and so on. By contrast, when the frames are looped, the rendering occurs such that the beginning frame is rendered first, then "beginning"+1, "beginning"+2, "beginning"+3 . . . "ending"−3, "ending"−2, "ending"−1, ending frame, beginning frame, "beginning"+1, "beginning"+2 . . . and so on. By using backward and forward rendering, every two consecutive frames in the final cinemagraph will include subtle movement, which will result in smooth transition.

At block 410, the best movement to display is selected. In embodiments, a best cinemagraph may be one which has a few movements in the series frames, and few segments where movement occurs. This contrast between areas of movement and non-movement causes a feeling of wonder when watching a cinemagraph. Accordingly, a plurality of cinemagraphs may be selected at a time in the video where a few movements occurred simultaneously. To select the "best" cinemagraph, a plurality of cinemagraph from a sequence of frames may be scored according to the number of moving areas as well as the size of the movement in each area of each cinemagraph. The score based on the size of the movement in each area of each cinemagraph may be higher with the size or distance of the movement is larger. The score may also be based on the quality of the loop computed at block 408. The score may be higher for cinemagraphs with a larger number of pixel values that are less than some threshold in absolute value when the pixel values of the beginning frame and ending frame are subtracted when compared to cinemagraphs that are greater than the threshold in absolute value when the beginning frame and ending frame are subtracted. The score may also be larger for those cinemagraphs with a large number of pixel values that are low when the pixel values of the beginning frame and ending frame are subtracted when compared to cinemagraphs with a large number of pixel values that are high when the pixel values of the beginning frame and ending frame are subtracted. The various ways to calculate a score for each cinemagraph is for exemplary purposes. The present techniques may be scored according to any feature of the cinemagraphs.

The best cinemagraph may the selected according to the computed score. In embodiments, the score of the size of the movement may be computed according to how many pixels change, where it is desirable for the movement to be big and noticeable. Additionally, in embodiments, the user can choose different areas to feature a movement based on the size of each movement. At block 412, a GIF may be generated from the best cinemagraph where the movement is looping and the remainder of the GIF is frozen. The GIF may be iterated using the times and resulting beginning and ending frames computed at block 408, and freezing the rest of the image via a mask as described above. This is an automatic cinemagraph. Another possible output at block 414 is an interactive "hover mode" using the best cinemagraph. In hover mode, each of the movements found at block 408 and block 410 are displayed, when there were different movements simultaneously. The current movement that iterates may be changed according to the place of interest. The place of interest may be defined by the user's cursor. In this manner, every region that the user is hovers upon with the cursor is waking to life, while the previous region freezes. Thus, in embodiments, hover mode is an interactive cinemagraph where movement occurs only in the area where the user's cursor is hovering. In embodiments, any input device may be used to indicate a region of interest in hover mode, such as a touchpad, fingers, keyboard, or any other pointing/input device.

The present techniques enable obtaining an automatically generated cinemagraph. Cinemagraphs are not automatically created and instead require experts with sophisticated tools to create the cinemagraph, which limits the availability and spread of this art. The present techniques simplify the process of cinemagraph generation. Moreover, many people will find it fun and would like to play with it and share it across social networks. Further, the particular area of a video used for movement in the cinemagraph may be selected by a user, give further user control of cinemagraph generation.

Figure 6:
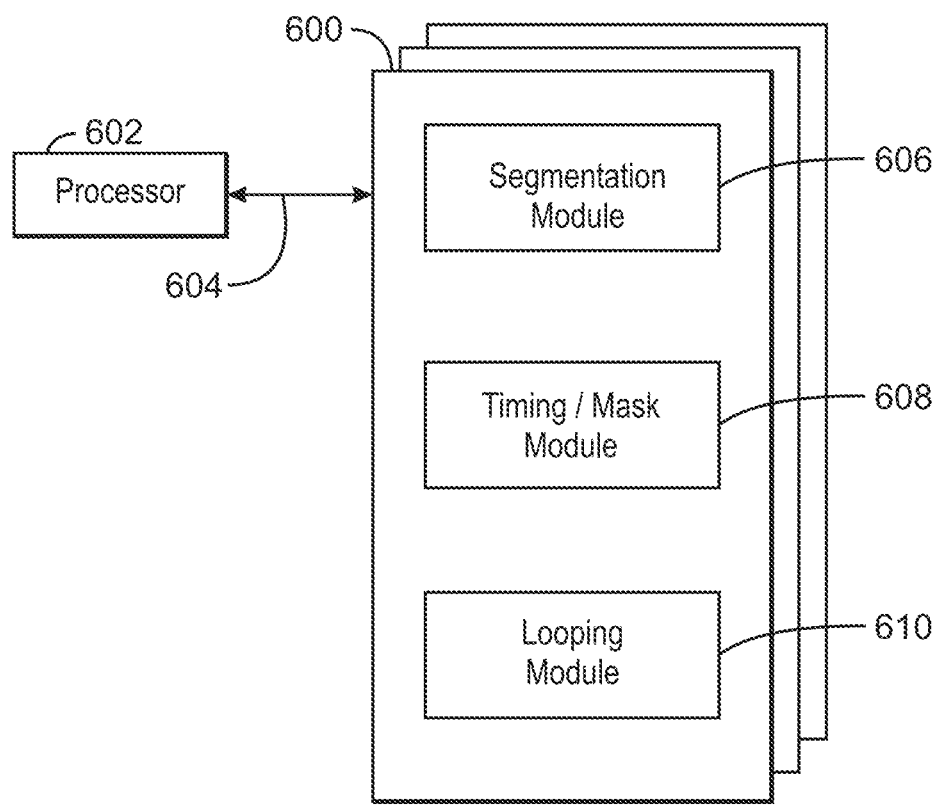
FIG. 6 is a block diagram showing a tangible, non-transitory computer-readable medium that stores instructions for automatic cinemagraph creation.

FIG. 6 is a block diagram showing a tangible, non-transitory computer-readable medium that stores instructions for automatic cinemagraph creation. The tangible, non-transitory computer-readable media 600 may be accessed by a processor 602 over a computer bus 604. Furthermore, the tangible, non-transitory computer-readable medium 600 may include code configured to direct the processor 602 to perform the methods described herein.

The various software components discussed herein may be stored on one or more tangible, non-transitory computer-readable media 600, as indicated in FIG. 6. A segmentation module 606 may be configured to distinguishing dynamic objects from static objects in the series of images. A timing/mask module 608 may be configured to select times such that a few movements have occurred during that time. The mask may also be selected. At block 610, a looping module 610 may be configured generate a GIF where the movement discovered in the series of images is looping, while the remainder of the series of images is frozen.

The block diagram of FIG. 6 is not intended to indicate that the tangible, non-transitory computer-readable media 600 is to include all of the components shown in FIG. 6. Further, the tangible, non-transitory computer-readable media 600 may include any number of additional components not shown in FIG. 6, depending on the details of the specific implementation.

Figure 7:
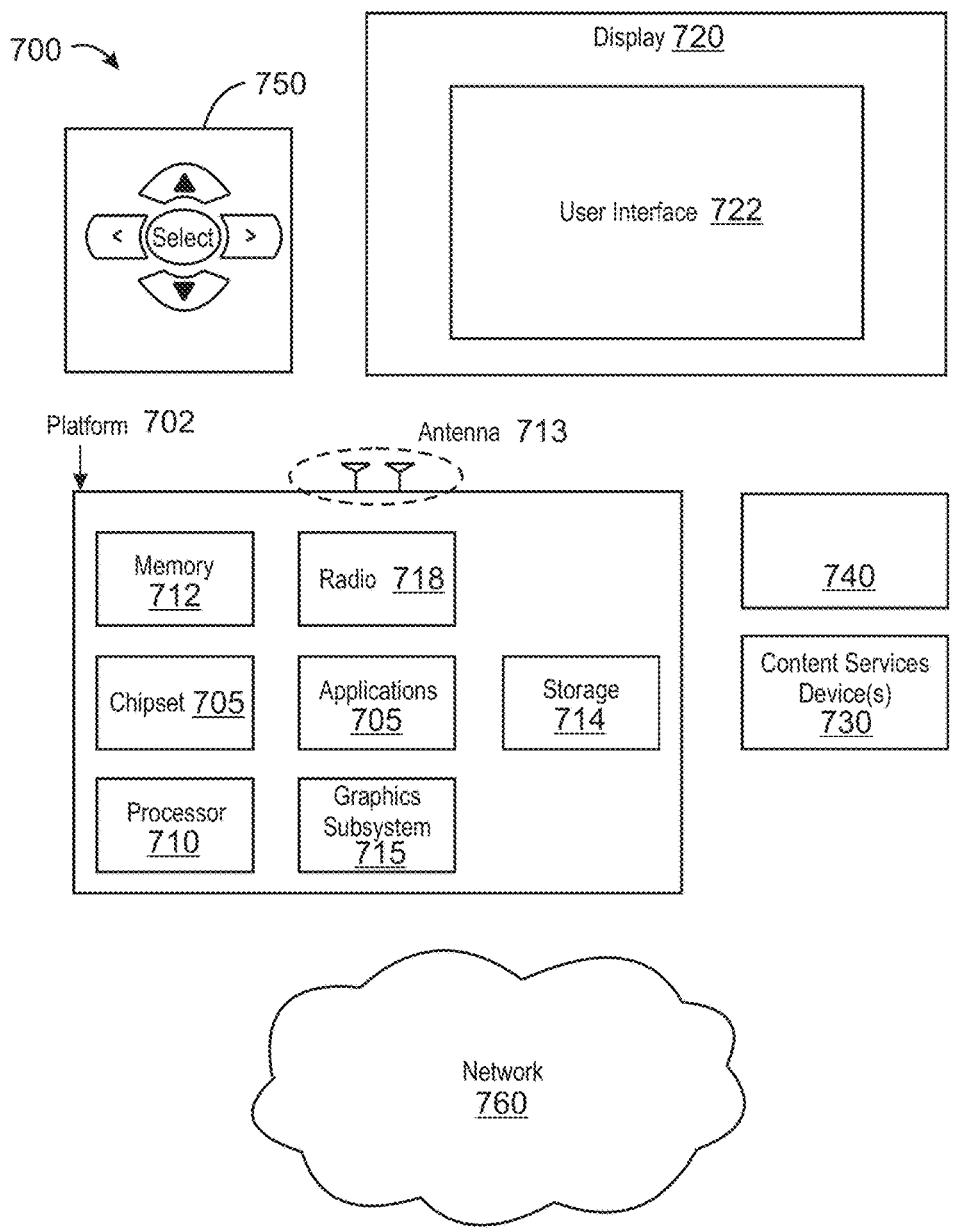
FIG. 7 is an illustrative diagram of an example system, arranged in accordance with at least some implementations of the present disclosure.

FIG. 7 is an illustrative diagram of an example system 700, arranged in accordance with at least some implementations of the present disclosure. In various implementations, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include any combination of a chipset 705, processor 710, memory 712, antenna 713, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM). Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 may be integrated into processor 710 or chipset 705. In some implementations, graphics subsystem 715 may be a stand-alone device communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of uni-directionally or bi-directionally communicating content between content providers and platform 702 and/display 720, via network 760 or directly. It will be appreciated that the content may be communicated uni-directionally and/or bi-directionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way. In various implementations, platform 702 may receive control signals from navigation controller 750 having one or more navigation features. The navigation features of controller 750 may be used to interact with user interface 722, for example. In various embodiments, navigation controller 750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be replicated on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In various embodiments, controller 750 may not be a separate component but may be integrated into platform 702 and/or display 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the present disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
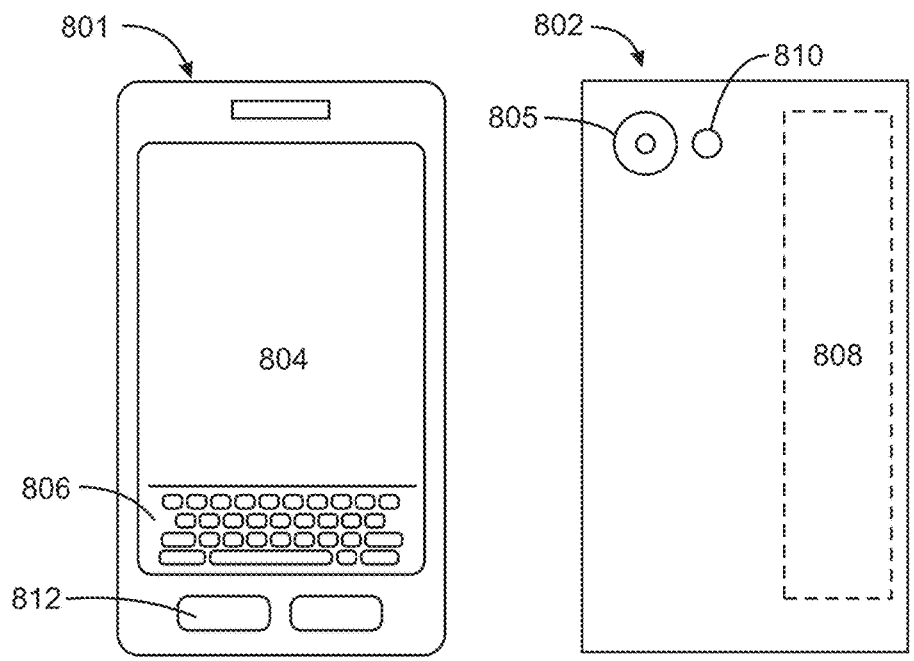
FIG. 8 illustrates an example small form factor device, arranged in accordance with at least some implementations of the present disclosure.

As described above, system 700 may be embodied in varying physical styles or form factors. FIG. 8 illustrates an example small form factor device 800, arranged in accordance with at least some implementations of the present disclosure. In some examples, system 700 may be implemented via device 800. In other examples, device 100 or portions thereof may be implemented via device 800. In various embodiments, for example, device 800 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a housing with a front 801 and a back 802. Device 800 includes a display 804, an input/output (I/O) device 806, and an integrated antenna 808. Device 800 also may include navigation features 812. I/O device 806 may include any suitable I/O device for entering information into a mobile computing device. Examples for I/O device 806 may include an alphanumeric keyboard, a numeric keypad, a touch pad, input keys, buttons, switches, microphones, speakers, voice recognition device and software, and so forth. Information also may be entered into device 800 by way of microphone (not shown), or may be digitized by a voice recognition device. As shown, device 800 may include a camera 805 (e.g., including a lens, an aperture, and an imaging sensor) and a flash 810 integrated into back 802 (or elsewhere) of device 800. In other examples, camera 805 and flash 810 may be integrated into front 801 of device 800 or both front and back cameras may be provided. Camera 805 and flash 810 may be components of a camera module to originate image data processed into streaming video that is output to display 804 and/or communicated remotely from device 800 via antenna 808 for example.

Example 1 is a system for performing automatic cinemagraph creation. The system includes a memory configured to receive series of frames; and a processor coupled to the memory, the processor to: segment moving areas and non-moving areas in the series of frames into a plurality of segments based on color; select a beginning frame and an ending frame; apply a mask to the non-moving areas of the beginning frame, the ending frame, and a plurality of frames with timestamps between a timestamp of the beginning frame and a timestamp of the ending frame; generating a cinemagraph by iteratively rendering the beginning frame, the ending frame, and the plurality of frames.

Example 2 includes the system of example 1, including or excluding optional features. In this example, segmenting the series of frames based on color distinguishes dynamic objects from static objects.

Example 3 includes the system of any one of examples 1 to 2, including or excluding optional features. In this example, a second segmentation is performed on the plurality of segments using depth data to further segment the plurality of segments based on depth.

Example 4 includes the system of any one of examples 1 to 3, including or excluding optional features. In this example, selecting the beginning frame and the ending frame comprises finding the beginning frame and the ending frame with the least amount of jitter after every iteration when the beginning frame, the ending frame, and the plurality of frames are rendered in a looping fashion.

Example 5 includes the system of any one of examples 1 to 4, including or excluding optional features. In this example, generating the cinemagraph comprises finding rendering the beginning frame, the ending frame, and the plurality of frames in an iterative backward and forward fashion.

Example 6 includes the system of any one of examples 1 to 5, including or excluding optional features. In this example, a sparse tracker is used to automatically find the beginning frame and the ending frame of the cinemagraph based on an optical flow. Optionally, the sparse tracker is a Lucas-Kanade tracker.

Example 7 includes the system of any one of examples 1 to 6, including or excluding optional features. In this example, the series of frames is used to generate a plurality of cinemagraphs with varying beginning and ending frames. Optionally, the plurality of cinemagraphs are scored according to the movements within each respective cinemagraph. Optionally, a user can select a best cinemagraph based on the score of each cinemagraph.

Example 8 includes the system of any one of examples 1 to 7, including or excluding optional features. In this example, the cinemagraph is generated in a hover mode.

Example 9 is a method for performing automatic cinemagraph creation. The method includes segmenting moving areas and non-moving areas in a series of frames based on color; selecting a most fitting times for each of a beginning frame and an ending frame and a mask based on the plurality of segments; and applying the mask to a series of images between the beginning frame and the ending frame to generate a cinemagraph that iteratively renders the beginning frame, the ending frame, and the frames that occur between the beginning frame and the ending frame.

Example 10 includes the method of example 9, including or excluding optional features. In this example, method of claim 12, segmenting the series of images refers to distinguishing dynamic objects from static objects.

Example 11 includes the method of any one of examples 9 to 10, including or excluding optional features. In this example, a second segmentation is performed on the plurality of segments using depth data.

Example 12 includes the method of any one of examples 9 to 11, including or excluding optional features. In this example, selecting the most fitting times for each of a beginning frame and an ending frame comprises finding a beginning and an ending frame with the least amount of jitter between the beginning frame and the ending frame.

Example 13 includes the method of any one of examples 9 to 12, including or excluding optional features. In this example, a sparse tracker is used to automatically find the beginning and ending frames of the cinemagraph.

Example 14 includes the method of any one of examples 9 to 13, including or excluding optional features. In this example, the method includes rendering the beginning frame, the ending frame, and the frames that occur between the beginning frame and the ending frame in an iterative backward and forward fashion when jitter occurs between the beginning frame and the ending frame.

Example 15 includes the method of any one of examples 9 to 14, including or excluding optional features. In this example, a sparse tracker is used to automatically find the beginning frame and the ending frame of the cinemagraph based on an optical flow.

Example 16 includes the method of any one of examples 9 to 15, including or excluding optional features. In this example, the cinemagraph is generated in a hover mode.

Example 17 includes the method of any one of examples 9 to 16, including or excluding optional features. In this example, method of claim 12, the series of frames is used to generate a plurality of cinemagraphs with varying beginning and ending frames Example 18 includes the method of any one of examples 9 to 17, including or excluding optional features. In this example, the plurality of cinemagraphs are scored according to the movements within each respective cinemagraph and a user can select a best cinemagraph based on the score of each cinemagraph.

Example 19 is an apparatus for automatic cinemagraph creation. The apparatus includes a controller to segmenting moving areas and non-moving areas in the series of frames based on color; a likelihood unit to select a beginning frame and an ending frame; a masking unit to apply a mask to the non-moving areas of the beginning frame, the ending frame, and a plurality of frames with timestamps between a timestamp of the beginning frame and a timestamp of the ending frame; a cinemagraph generator to generate a cinemagraph by iteratively rendering the beginning frame, the ending frame, and the plurality of frames.

Example 20 includes the apparatus of example 19, including or excluding optional features. In this example, segmenting the series of frames based on color distinguishes dynamic objects from static objects.

Example 21 includes the apparatus of any one of examples 19 to 20, including or excluding optional features. In this example, a second segmentation is performed on the plurality of segments using depth data to further segment the plurality of segments based on depth.

Example 22 includes the apparatus of any one of examples 19 to 21, including or excluding optional features. In this example, selecting the beginning frame and the ending frame comprises finding the beginning frame and the ending frame with the least amount of jitter after every iteration when the beginning frame, the ending frame, and the plurality of frames are rendered in a looping fashion.

Example 23 includes the apparatus of any one of examples 19 to 22, including or excluding optional features. In this example, generating the cinemagraph comprises rendering the beginning frame, the ending frame, and the plurality of frames in an iterative backward and forward fashion.

Example 24 includes the apparatus of any one of examples 19 to 23, including or excluding optional features. In this example, a sparse tracker is used to automatically find the beginning frame and the ending frame of the cinemagraph based on an optical flow. Optionally, the sparse tracker is a Lucas-Kanade tracker.

Example 25 includes the apparatus of any one of examples 19 to 24, including or excluding optional features. In this example, apparatus of claim 22, the series of frames is used to generate a plurality of cinemagraphs with varying beginning and ending frames. Optionally, the plurality of cinemagraphs are scored according to the movements within each respective cinemagraph. Optionally, a user can select a best cinemagraph based on the score of each cinemagraph.

Example 26 includes the apparatus of any one of examples 19 to 25, including or excluding optional features. In this example, the cinemagraph generator is to generate a hover mode cinemagraph.

Example 27 includes the apparatus of any one of examples 19 to 26, including or excluding optional features. In this example, the cinemagraph generator is to generate a GIF format cinemagraph.

Example 28 is at least one machine readable medium comprising a plurality of instructions that. The computer-readable medium includes instructions that direct the processor to segment moving areas and non-moving areas in a series of frames based on color; select a most fitting times for each of a beginning frame and an ending frame and a mask based on the plurality of segments; and apply the mask to a series of images between the beginning frame and the ending frame to generate a cinemagraph that iteratively renders the beginning frame, the ending frame, and the frames that occur between the beginning frame and the ending frame.

Example 29 includes the computer-readable medium of example 28, including or excluding optional features. In this example, computer readable medium of claim 34, segmenting the series of images refers to distinguishing dynamic objects from static objects.

Example 30 includes the computer-readable medium of any one of examples 28 to 29, including or excluding optional features. In this example, a second segmentation is performed on the plurality of segments using depth data.

Example 31 includes the computer-readable medium of any one of examples 28 to 30, including or excluding optional features. In this example, selecting the most fitting times for each of a beginning frame and an ending frame comprises finding a beginning and an ending frame with the least amount of jitter between the beginning frame and the ending frame.

Example 32 includes the computer-readable medium of any one of examples 28 to 31, including or excluding optional features. In this example, a sparse tracker is used to automatically find the beginning and ending frames of the cinemagraph.

Example 33 includes the computer-readable medium of any one of examples 28 to 32, including or excluding optional features. In this example, the computer-readable medium includes rendering the beginning frame, the ending frame, and the frames that occur between the beginning frame and the ending frame in an iterative backward and forward fashion when jitter occurs between the beginning frame and the ending frame.

Example 34 includes the computer-readable medium of any one of examples 28 to 33, including or excluding optional features. In this example, a sparse tracker is used to automatically find the beginning frame and the ending frame of the cinemagraph based on an optical flow.

Example 35 includes the computer-readable medium of any one of examples 28 to 34, including or excluding optional features. In this example, the cinemagraph is generated in a hover mode.

Example 36 includes the computer-readable medium of any one of examples 28 to 35, including or excluding optional features. In this example, computer readable medium of claim 34, the series of frames is used to generate a plurality of cinemagraphs with varying beginning and ending frames.

Example 37 includes the computer-readable medium of any one of examples 28 to 36, including or excluding optional features. In this example, the plurality of cinemagraphs are scored according to the movements within each respective cinemagraph and a user can select a best cinemagraph based on the score of each cinemagraph.

Example 38 is an apparatus for automatic cinemagraph creation. The apparatus includes instructions that direct the processor to a means to segmenting moving areas and non-moving areas in the series of frames based on color; a likelihood unit to select a beginning frame and an ending frame; a masking unit to apply a mask to the non-moving areas of the beginning frame, the ending frame, and a plurality of frames with timestamps between a timestamp of the beginning frame and a timestamp of the ending frame a means to generate a cinemagraph by iteratively rendering the beginning frame, the ending frame, and the plurality of frames.

Example 39 includes the apparatus of example 38, including or excluding optional features. In this example, segmenting the series of frames based on color distinguishes dynamic objects from static objects.

Example 40 includes the apparatus of any one of examples 38 to 39, including or excluding optional features. In this example, a second segmentation is performed on the plurality of segments using depth data to further segment the plurality of segments based on depth.

Example 41 includes the apparatus of any one of examples 38 to 40, including or excluding optional features. In this example, selecting the beginning frame and the ending frame comprises finding the beginning frame and the ending frame with the least amount of jitter after every iteration when the beginning frame, the ending frame, and the plurality of frames are rendered in a looping fashion.

Example 42 includes the apparatus of any one of examples 38 to 41, including or excluding optional features. In this example, the means to generate the cinemagraph renders the beginning frame, the ending frame, and the plurality of frames in an iterative backward and forward fashion.

Example 43 includes the apparatus of any one of examples 38 to 42, including or excluding optional features. In this example, a sparse tracker is used to automatically find the beginning frame and the ending frame of the cinemagraph based on an optical flow. Optionally, the sparse tracker is a Lucas-Kanade tracker.

Example 44 includes the apparatus of any one of examples 38 to 43, including or excluding optional features. In this example, the means to generate the cinemagraph is to generate a plurality of cinemagraphs using the series of frames with varying beginning and ending frames. Optionally, the plurality of cinemagraphs are scored according to the movements within each respective cinemagraph. Optionally, a user can select a best cinemagraph based on the score of each cinemagraph.

Example 45 includes the apparatus of any one of examples 38 to 44, including or excluding optional features. In this example, the means to generate the cinemagraph is to generate a hover mode cinemagraph.

Example 46 includes the apparatus of any one of examples 38 to 45, including or excluding optional features. In this example, the means to generate the cinemagraph is to generate a GIF format cinemagraph.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for performing automatic cinemagraph creation, comprising:
   a memory configured to receive a series of frames; and
   a processor coupled to the memory, the processor to:
   segment moving areas and non-moving areas in the series of frames into a plurality of segments based on color;
   select a beginning frame and an ending frame from the series of frames;
   apply a mask to the non-moving areas of the beginning frame, apply the mask to the ending frame, and apply the mask to a plurality of frames with timestamps between a timestamp of the beginning frame and a timestamp of the ending frame;
   generating a cinemagraph by iteratively rendering the beginning frame, the ending frame, and the plurality of frames.

2. The system of claim 1, wherein segmenting the series of frames based on color distinguishes dynamic objects from static objects.

3. The system of claim 1, wherein a second segmentation is performed on the plurality of segments using depth data to further segment the plurality of segments based on depth.

4. The system of claim 1, wherein selecting the beginning frame and the ending frame comprises finding the beginning frame and the ending frame with the least amount of jitter after every iteration when the beginning frame, the ending frame, and the plurality of frames are rendered in a looping fashion.

5. The system of claim 1, wherein generating the cinemagraph comprises finding rendering the beginning frame, the ending frame, and the plurality of frames in an iterative backward and forward fashion.

6. The system of claim 1, wherein a sparse tracker is used to automatically find the beginning frame and the ending frame of the cinemagraph based on an optical flow.

7. The system of claim 1, wherein the series of frames is used to generate a plurality of cinemagraphs with varying beginning and ending frames, and wherein the plurality of cinemagraphs are scored according to the movements within each respective cinemagraph.

8. The system of claim 1, wherein the cinemagraph is generated in a hover mode.

9. A method for performing automatic cinemagraph creation, comprising:
   segmenting moving areas and non-moving areas in a series of frames based on color;
   selecting a most fitting time for each of a beginning frame and an ending frame and a mask based on the plurality of segments; and
   applying the mask to the beginning frame, the ending frame, and each image of a series of images between the beginning frame and the ending frame to generate a cinemagraph that iteratively renders the beginning frame, the ending frame, and the frames that occur between the beginning frame and the ending frame.

10. The method of claim 9, segmenting the series of images refers to distinguishing dynamic objects from static objects.

11. The method of claim 9, wherein a second segmentation is performed on the plurality of segments using depth data.

12. The method of claim 9, wherein selecting the most fitting time for each of a beginning frame and an ending frame comprises finding a beginning and an ending frame with the least amount of jitter between the beginning frame and the ending frame.

13. The method of claim 9, wherein a sparse tracker is used to automatically find the beginning and ending frames of the cinemagraph.

14. An apparatus for automatic cinemagraph creation, comprising:
   a controller to segment moving areas and non-moving areas in a series of frames based on color to obtain a plurality of segments, wherein pixels with no change in color are found to obtain the plurality of segments and a mask is generated based on the pixels with no change in color in the series of frames;
   a processor to select a beginning frame and an ending frame of the series of frames;
   another processor to apply the mask to the non-moving areas of the beginning frame, apply the mask to the non-moving areas of the ending frame, and apply the mask to the non-moving areas of a plurality of frames with timestamps between a timestamp of the beginning frame and a timestamp of the ending frame;
   a cinemagraph generator to generate a cinemagraph by iteratively rendering the beginning frame, the ending frame, and the plurality of frames.

15. The apparatus of claim 14, wherein segmenting the series of frames based on color distinguishes dynamic objects from static objects.

16. The apparatus of claim 14, wherein a second segmentation is performed on the plurality of segments using depth data to further segment the plurality of segments based on depth.

17. The apparatus of claim 14, wherein selecting the beginning frame and the ending frame comprises finding the beginning frame and the ending frame with the least amount of jitter after every iteration when the beginning frame, the ending frame, and the plurality of frames are rendered in a looping fashion.

18. The apparatus of claim 14, wherein generating the cinemagraph comprises rendering the beginning frame, the ending frame, and the plurality of frames in an iterative backward and forward fashion.

19. The apparatus of claim 14, wherein a sparse tracker is used to automatically find the beginning frame and the ending frame of the cinemagraph based on an optical flow.

20. At least one non-transitory machine readable medium comprising a plurality of instructions that, in response to being executed on a computing device, cause the computing device to:
   segment moving areas and non-moving areas in a series of frames based on color into a plurality of segments;
   select a most fitting time for each of a beginning frame and an ending frame from the series of frames based on the plurality of segments;
   select a mask based on the plurality of segments; and
   apply the mask to the beginning frame, the ending frame, and each image of a series of images between the beginning frame and the ending frame to generate a cinemagraph that iteratively renders the beginning frame, the ending frame, and the frames that occur between the beginning frame and the ending frame.

21. The non-transitory machine readable medium of claim 20, segmenting the series of frames refers to distinguishing dynamic objects from static objects for each frame.

22. The non-transitory machine readable medium of claim 20, wherein a second segmentation is performed on the plurality of segments using depth data.

23. The non-transitory machine readable medium of claim 20, wherein selecting the most fitting time for each of a beginning frame and an ending frame comprises finding a beginning and an ending frame with the least amount of jitter between the beginning frame and the ending frame.

24. The non-transitory machine readable medium of claim 20, wherein a sparse tracker is used to automatically find the beginning and ending frames of the cinemagraph.

25. The non-transitory machine readable medium of claim 20, wherein the cinemagraph is generated in a hover mode.

* * * * *